Dec. 25, 1945.  R. R. CRAMER  2,391,682
SAFETY DEVICE
Filed Aug. 28, 1944

INVENTOR
Richard R. Cramer
BY Robb & Robb
ATTORNEYS

Patented Dec. 25, 1945

2,391,682

UNITED STATES PATENT OFFICE 2,391,682

SAFETY DEVICE

Richard R. Cramer, Dayton, Ohio

Application August 28, 1944, Serial No. 551,571

6 Claims. (Cl. 192—82)

This invention relates to safety devices designed particularly for machines having a repeating cycle under the control of an operator, the safety devices of this type being adapted to prevent repetition of the operating cycle in the event that the operator inadvertently maintains the machine control means actuated.

The device of the present invention is adapted particularly to provide a safety coupling interconnecting the clutch pedal and clutch linkage of a power press or similar machine to provide automatic disengagement of the clutch linkage during actuation of the clutch pedal.

A particular object of the present invention is to provide a safety coupling of the above type which is adapted to be used upon either high speed or slow speed power presses without any change in the structure of the safety coupling.

Another object of the invention is to provide a safety device of the above type comprising relatively fewer moving parts than devices of this type heretofore used.

Another object of the invention is to provide a safety coupling of the type referred to comprising an arrangement of structure involving relatively fewer points of heavy wear or stress than the structures of devices of this type heretofore proposed.

Another object of the invention is to provide a safety device of the character described comprising a coupling including elements normally locked together for integral movement, releasing means for releasing said elements for relative movement, and means for controlling the maximum rate of relative movement of said elements upon release of the same from interlocked condition.

Another object of the invention is to provide a safety device of the type referred to comprising a coupling utilizing hydraulic means for controlling the maximum rate of relative movement of the relatively movable elements.

In safety devices of this type heretofore known in the art there is usually provided a coupling interconnecting the clutch pedal and the clutch linkage providing automatic disengagement of the clutch linkage during the actuation of the clutch pedal. Safety devices heretofore known in the art operate in such a manner that, upon such disengagement of the clutch linkage, the clutch means is practically instantaneously restored to the condition which obtained prior to actuation of the clutch pedal. The instantaneous restoration of the clutch means to its initial condition upon disengagement of the clutch linkage is oft-times disadvantageous in that the clutch means will not always be maintained actuated for a sufficient length of time to afford a completion of the machine cycle.

It is, therefore, an important object of the present invention to provide a safety coupling of the type referred to with means for controlling the time of restoration of the clutch means to its initial condition so as to delay such restoration for a sufficient length of time, after disengagement of the clutch linkage, to insure completion of the operating cycle of the machine.

Another object of the invention is to provide a safety device of the above type with such control means operative to delay restoration of the clutch means and also operative to permit rapid restoration of the clutch pedal to its initial condition upon release of the same.

Another object of the invention is to provide a safety coupling of the above type wherein the relative movement of the coupled elements after their release from locked condition, is controlled so that said elements are permitted to move relatively to one another more rapidly in one direction of their relative movement than in the other direction of their relative movement.

Other objects, advantages, and features of the invention will become apparent from the following detailed description taken in conjunction with the accompanying drawing, in which.

Figures 1, 2:
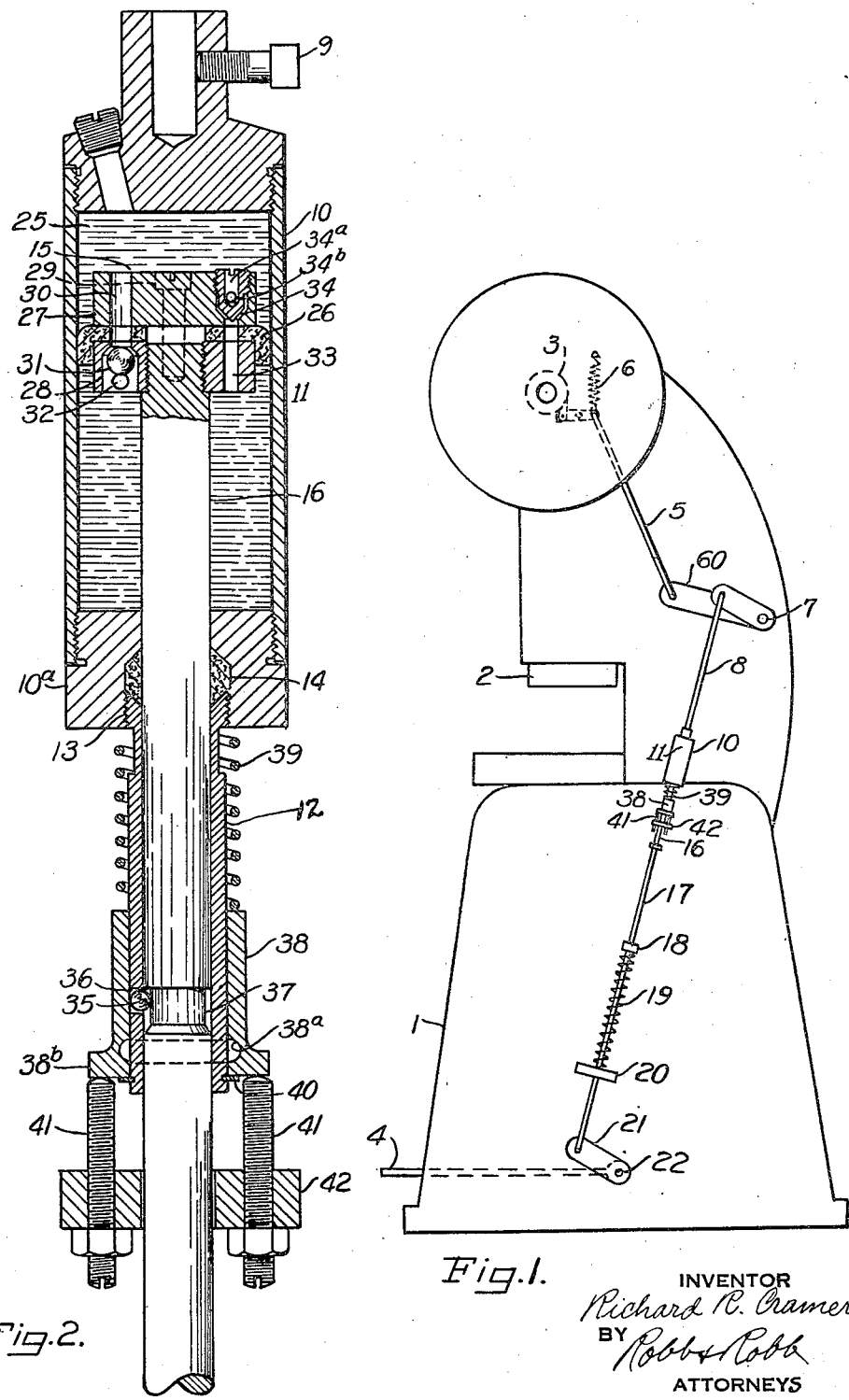
Fig. 1 is a diagrammatic elevation of a power press provided with a safety coupling according to my invention.
Fig. 2 is a sectional view of the safety device or coupling of my invention.

Now referring to the drawing for a detailed description of the invention, Fig. 1 illustrates the invention as applied to a conventional power press generally indicated by the numeral I which is provided with a motivated ram element 2 operated by motive elements of the press through a clutch 3. The clutch in turn is actuated by depressing the clutch pedal or actuating member 4 which serves, through intermediate linkage, to pull downwardly the clutch operating means comprising link 5. The clutch 3 is biased to disengaged condition by spring means 6 which serves to bias the link 5 upwardly, having reference to Fig. 1.

The link 5 is pivoted to one arm of a bell crank 60 which in turn is pivoted as at 7 to the frame of the power press I. A link 8 is pivoted to the bell crank 60 and connected by means of a set screw 9 to the hydraulic cylinder 10 of the safety device or coupling generally indicated by the numeral 11 and best shown in Fig. 2. A sleeve 12 is threadedly connected as at 13 to the lower end of the cylinder 10, a gasket 14 fitting in tapered seats provided in the lower cylinder head 10a and the adjacent end of the sleeve 12, respectively. A piston element generally indicated by the numeral 15 works in the cylinder 10 and has associated therewith a piston rod or operating element 16 which extends through the lower cylinder head 10a and also through the sleeve element 12.

The lower end of the piston rod 16 is secured to a link 17 provided with an abutment 18 fixed thereto against which the spring 19 bears. The other end of spring 19 bears against an abutment 20 fixed to the frame of the punch press 1. Link 17 is pivoted to bell crank 21 which is pivoted as at 22 to the punch press frame 1 and is integral with clutch foot pedal 4 so that spring 19 biases clutch pedal 4 upwardly.

The cylinder 10 is adapted to be completely filled with liquid 25, such as oil or the like commonly employed in hydraulic devices. The piston element generally designated by the number 15 comprises a gland 26 clamped between members 27 and 28 by means of bolts or screws 29. The piston element 15 is provided with one or more passages 30 therethrough, each controlled by respective ball check valve member 31 adapted to cooperate with a suitable seat provided in the passage 30 for closing the passage 30 to prevent the movement of liquid therethrough. Ball valve members 31 are free to move off their seats due to the pressure of liquid 25 in the cylinder 10 when the piston element 15 is moved upwardly relative to cylinder 10, thereby permitting movement of fluid through the passage 30 during the upward movement of the piston 15 relative to cylinder 10. Under such condition the ball valve members 31 are retained in association with piston element 15 by impingement of balls 31 with pins 32 secured to the piston element 15, each pin 32 extending transversely across the lower end of a respective passage 30.

The piston element 15 is also provided with one or more passages 33 therethrough controlled by respective needle valves 34, each of the latter being threaded into a respective passage 33 and having a port 34a communicating with a passage 34b leading through the needle valve 34. The needle valves 34 are provided with screw driver receiving slots for enabling same to be readily adjusted to vary the maximum rate of movement of liquid through the passages 33.

The piston rod or operating element 16 is normally locked to the sleeve 12 by means of a ball 35 lying in an aperture 36 through the wall of the sleeve element 12, said ball 35 extending into an annular recess 37 provided in the operating element or piston rod 16. The ball 35 is maintained in cooperation with the recess 37 to interlock the elements 12 and 16 by retaining means comprising an abutment collar 38 slidably mounted on the sleeve element 12, the inner wall of the collar 38 closely encompassing the sleeve element 12 so as to impinge the ball 35 and normally prevent it from being withdrawn from the recess 37 in the rod 16. The collar 38 is provided with an interior annular recess 38a adapted to partially receive the ball 35 when the recess 38a is in register with the aperture 36. Normally, however, the collar 38 is maintained in the position relative to sleeve element 12, as shown in Fig. 2, by means of spring 39 biasing the collar 38 downwardly on the sleeve 12 into engagement with a snap ring 40 received in an annular groove at the lower end of the sleeve element 12.

The collar 38 has an enlarged annular base portion 38b which is adapted to impinge bolts 41 which are adjustable relative to an abutment 42 secured to the frame of the press 1.

In operation, when the clutch pedal 4 is depressed, this serves to pull downwardly the link 5 against the action of the spring 6 to engage the clutch 3 for actuation of the ram 2. As soon as the clutch 3 is engaged to actuate the ram 2, the link 5 becomes disconnected from the foot pedal 4, due to the operation of the safety coupling 11, thus permitting the clutch to be disengaged by action of spring 6. The action of the spring 6 in restoring the clutch 3 to disengaged condition is, however, delayed by the resistance of the liquid 25 to relative movement of the piston and cylinder elements 10 and 15, the time interval (i. e., the time interval required for restoration of the clutch 3 to disengaged condition after the automatic disconnection of clutch pedal 4 from the link 5) being controlled by adjustment of the valve means 34 associated with piston element 15. Thus the ram 2 is actuated only once each time the clutch pedal 4 is depressed. The ram 2 cannot be actuated again until the foot pedal 4 is permitted to rise to its original position and then again depressed.

A more detailed description of the operation will now be given:

When the clutch pedal 4 is depressed, the linkage intermediate the foot pedal 4 and the link 5 acts initially as an integral unit to pull link 5 downwardly to engage the clutch 3 for actuation of ram 2, there being no initial relative movement between the piston 15 and the cylinder 10 due to the interlocked condition of the sleeve element 12 and the piston rod or operating element 16 by reason of the ball 35 engaging in the recess 37 as shown in Fig. 2. However, the downward movement of the piston rod 16 causes the sleeve element 12 (with which the rod 16 is interconnected by the ball 26) to move downwardly relative to collar 38 which is prevented from moving downwardly by engagement with bolts 41 on the fixed abutment 42, the spring 39 being compressed under such condition. The downward movement of the rod 16 and sleeve element 12 relative to the collar 38 brings the ball 35 into register with the internal annular groove 38a in the collar 38 thereby allowing the ball 35 to be cammed into the recess 38a and out of the recess 37 by the continued downward movement of the piston rod 16, thus breaking the connection between the piston rod 15 and the sleeve element 12 and simultaneously interlocking the sleeve element 12 with the collar 38.

Upon the breaking of the connection between the rod 16 and sleeve element 12, due to the camming of the ball 35 out of the recess 37 and into the recess 38a, the piston 15 and cylinder 10 are conditioned for relative movement, the cylinder 10 being drawn upwardly relative to the piston 15 due to the action of the spring 6, thereby allowing the clutch 3 to be restored to its initial disengaged condition by the action of the spring 6, although the clutch pedal 4 remains depressed During the upward movement of the cylinder 10 relative to the piston 15 under the action of the spring 6, after disengagement of the piston rod 16 from interlocked condition with the sleeve 12, liquid 25 is compressed between the piston 15 and the lower cylinder head 10a thereby forcing some of the liquid 25 to move through the passages 33 so as to permit the upward movement of the cylinder 10 relative to the piston 15. Under such conditions liquid 25 cannot move through the passage 30 due to the pressure of the liquid 25 below the piston 15 forcing the ball 31 to its seat and thereby closing the passage 30.

It will be apparent from the foregoing that the maximum rate of upward movement of the cylinder 10 relative to the piston 15 may be controlled or varied by the adjustment of the needle valves 34. This adjustment will depend upon the length of time during which the clutch means 3 must remain engaged to insure the completion of one cycle of operation of the ram 2. It will also be apparent that the greater the needle valve opening, the more rapid will be the upward movement of the cylinder 10 relative to the piston 15 under the action of the spring 6 after disengagement of the piston rod 16 from interlocked condition with the sleeve element 12. Conversely, the smaller the needle valve opening the slower will be the upward movement of the cylinder 10 relative to the piston 15 and hence the longer will be the period during which the clutch 3 will remain engaged. Since the length of time during which the clutch must remain engaged to insure the completion of one cycle of operation of the ram varies with the operating speeds of different types of presses, it will be apparent from the foregoing that the safety coupling of the present invention is applicable for use with presses of various speeds by simply adjusting the needle valves 34 for the proper rate of upward return movement of the cylinder 10 relative to the piston 15 for the particular power press to which the safety coupling of the invention is applied.

When the cylinder 10 moves upwardly relative to piston 15 under the action of the spring 6, the cylinder 10 carries with it the collar 38 interlocked to the sleeve element 12 by the engagement of the ball 35 in the recess 38a, the spring 39 being in compressed condition. When the downward pressure on the clutch pedal 4 is subsequently released, pedal 4, piston rod 16 and piston 15 are restored upwardly to their original upward positions under the action of the spring 19, the piston 15 moving upwardly relative to the cylinder 10 and the piston rod 16 moving upwardly relative to the sleeve element 12 under such condition. The maximum rate of upward movement of the piston 15 relative to the cylinder 10 is more rapid than the maximum rate of upward movement of the cylinder 10 relative to the piston 15, since the ball check valve member 31 is unseated during the upward movement of the piston relative to the cylinder 10. The more rapid rate of the upward movement of the piston 15 relative to the cylinder 10 is desirable in order to permit the instantaneous return of the clutch pedal 4 to its upward position immediately upon release of the downward pressure thereon. If it were not for the provision of the additional passages 30 for the movement of liquid past the piston 15 upon the upward movement thereof relative to cylinder 10, the restoration of the clutch pedal 4 to its upward position would be undesirably sluggish.

The above mentioned upward movement of the piston rod 16 relative to the sleeve 12 (upon release of the downward pressure upon the clutch pedal 4) causes the recess 37 to again move into register with the opening 36 permitting the ball 35 to be cammed into the recess 37 and out of the recess 38a by the movement of the collar 38 under the action of the spring 39, thereby restoring the collar 38 to its original position of Figure 2. The piston rod 16 is now again interlocked with sleeve 12 and the safety device 11 is otherwise now in condition for the operator to again actuate ram 2 by depressing clutch pedal 4.

Having thus described my invention, what I claim as new and desire to secure by Letters Patent is:

1. In a machine of the class described having clutch operating means and a clutch pedal for initiating operation of said clutch operating means, a safety device comprising a sleeve element connected to the clutch operating means, an operating element slidably mounted in said sleeve element, said operating element being connected to the clutch pedal, locking instrumentalities operative to interlock said elements to prevent relative movement thereof, release means for releasing said elements for relative movement, and hydraulic means associated with said elements for controlling the relative movement thereof, wherein the hydraulic means comprises a fluid cylinder, a piston reciprocable in said cylinder, said cylinder and said piston each being connected with a respective one of said elements, and valve means permitting movement of fluid from one side of said piston to the other and adjustable to vary the maximum rate of movement of said piston relative to said cylinder.

2. In a machine of the class described having clutch operating means and a clutch pedal for initiating operation of said clutch operating means, a safety device comprising a sleeve element connected to the clutch operating means, an operating element slidably mounted in said sleeve element, said operating element being connected to the clutch pedal, locking instrumentalities operative to interlock said elements to prevent relative movement thereof, release means for releasing said elements for relative movement, and hydraulic means associated with said elements for controlling the relative movement thereof, wherein the hydraulic means comprises a fluid cylinder, a piston reciprocable in said cylinder, said cylinder and said piston each being connected with a respective one of said elements, and valve means permitting movement of fluid from one side of said piston to the other and adjustable to vary the maximum rate of movement of said piston relative to said cylinder, said valve means including check valve means operative to retard the movement of said piston relative to said cylinder in one direction and operative to permit more rapid movement of the piston relative to the cylinder in the opposite direction.

3. In a machine of the class described having clutch operating means and a clutch pedal for initiating operation of said clutch operating means, a safety device comprising a sleeve element connected to the clutch operating means, an operating element slidably mounted in said sleeve element, said operating element being connected to the clutch pedal, locking instrumentalities operative to interlock said elements to prevent relative movement thereof, release means for releasing said elements for relative movement, and hydraulic means associated with said elements for controlling the relative movement thereof, wherein the hydraulic means comprises a fluid cylinder, a piston reciprocable in said cylinder, said cylinder and said piston each being connected with a respective one of said elements, and valve means permitting movement of fluid from one side of said piston to the other and adjustable to vary the maximum rate of movement of said piston relative to said cylinder, said valve means including check valve means operative to retard the movement of said piston relative to said cylinder in one direction and operative to permit more rapid movement of the piston relative to the cylinder in the opposite direction, said locking instrumentalities comprising a ball member carried by one of said elements and adapted to lockingly engage the other of said elements.

4. In a device of the class described adapted to interconnect an operating means and an actuating member for initiating operation of said operating means, in combination, a pair of elements associated for limited relative movement with respect to each other, one of said elements being adapted for connection with the operating means and the other of said elements being adapted for connection with the actuating member, locking instrumentalities operative to interlock said elements to prevent relative movement thereof, release means for releasing said elements for relative movement, and hydraulic means associated with said elements for controlling the relative movement, wherein the hydraulic means comprises a fluid cylinder, a piston operable in said cylinder, said cylinder and said piston each being connected with a respective one of said elements, a by-pass for movement of fluid to either side of said piston, and valve means for controlling the movement of fluid through said by-pass and adjustable to vary the maximum rate of relative movement of said elements.

5. In a device of the class described adapted to interconnect an operating means and an actuating member for initiating operation of said operating means, in combination, a pair of elements associated for limited relative movement with respect to each other, one of said elements being adapted for connection with the operating means and the other of said elements being adapted for connection with the actuating member, locking instrumentalities operative to interlock said elements to prevent relative movement thereof, release means for releasing said elements for relative movement, and hydraulic means associated with said elements for controlling the relative movement, wherein the hydraulic means comprises a fluid cylinder, a piston operable in said cylinder, said cylinder and said piston each being connected with a respective one of said elements, said piston having a by-pass passage therethrough for movement of fluid to either side of said piston, a valve member for controlling the movement of fluid through said passage and adjustable to vary the maximum rate of movement of fluid through said passage, said piston having a second by-pass passage therethrough for movement of fluid to either side of said piston, and check valve means controlling said second passage and operative to permit movement of fluid through said second passage when the piston is moved in one direction relative to the cylinder, said check valve means being operative to prevent movement of fluid through said second passage when said piston is moved in the opposite direction relative to said cylinder.

6. In a device of the class described adapted to interconnect an operating means and an actuating member for initiating operation of said operating means, in combination, a pair of elements associated for limited relative movement with respect to each other, one of said elements being adapted for connection with the operating means and the other of said elements being adapted for connection with the actuating member, locking instrumentalities operative to interlock said elements to prevent relative movement thereof, release means for releasing said elements for relative movement, and hydraulic means associated with said elements for controlling the relative movement, wherein the hydraulic means comprises a fluid cylinder, a piston operable in said cylinder, said cylinder and said piston each being connected with a respective one of said elements, said piston having a by-pass passage therethrough for movement of fluid to either side of said piston, a valve member for controlling the movement of fluid through said passage and adjustable to vary the maximum rate of movement of fluid through said passage, said piston having a second by-pass passage therethrough for movement of fluid to either side of said piston, and check valve means controlling said second passage and operative to permit movement of fluid through said second passage when the piston is moved in one direction relative to the cylinder, said check valve means being operative to prevent movement of fluid through said second passage when said piston is moved in the opposite direction relative to said cylinder, said locking instrumentalities comprising a ball member carried by the first element and movable relative thereto, the second element having a recess for cooperation with said ball member, a retaining member slidable on said first element and cooperable with said ball member to maintain the same in cooperative relation with said recess to interlock said elements, said retaining member having a recess cooperable with said ball member, said retaining member being movable relative to said elements to bring its recess into cooperative relation with said ball member, thereby permitting movement of the latter out of the first recess and into the second recess, and yieldable means normally urging said retaining member to a position relative to said elements in which the second recess is out of register with said ball member and the latter is retained in cooperative relation with said first recess.

RICHARD R. CRAMER.